United States Patent
Wang et al.

(10) Patent No.: US 9,524,730 B2
(45) Date of Patent: Dec. 20, 2016

(54) MONAURAL SPEECH FILTER

(71) Applicant: OHIO STATE INNOVATION FOUNDATION, Columbus, OH (US)

(72) Inventors: DeLiang Wang, Columbus, OH (US); Yuxuan Wang, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 141 days.

(21) Appl. No.: 14/388,260

(22) PCT Filed: Mar. 29, 2013

(86) PCT No.: PCT/US2013/034564
§ 371 (c)(1),
(2) Date: Sep. 26, 2014

(87) PCT Pub. No.: WO2013/149123
PCT Pub. Date: Oct. 3, 2013

(65) Prior Publication Data
US 2015/0066499 A1     Mar. 5, 2015

Related U.S. Application Data

(60) Provisional application No. 61/617,695, filed on Mar. 30, 2012.

(51) Int. Cl.
| | |
|---|---|
| *G10L 25/30* | (2013.01) |
| *G10L 21/0208* | (2013.01) |
| *G10L 21/0232* | (2013.01) |

(52) U.S. Cl.
CPC ....... *G10L 21/0208* (2013.01); *G10L 21/0232* (2013.01); *G10L 25/30* (2013.01); *G10L 2021/02087* (2013.01)

(58) Field of Classification Search
CPC ...................................................... G10L 25/30
(Continued)

(56) References Cited

U.S. PATENT DOCUMENTS

| | | | |
|---|---|---|---|
| 7,454,342 B2 * | 11/2008 | Nefian | G06K 9/6293 704/256 |
| 7,472,063 B2 * | 12/2008 | Nefian | G06K 9/6293 382/227 |

(Continued)

OTHER PUBLICATIONS

International Preliminary Report on Patentability issued Oct. 1, 2014 for International application No. PCT/US2013/034564.

(Continued)

*Primary Examiner* — Susan McFadden
(74) *Attorney, Agent, or Firm* — Fay Sharpe LLP (57) ABSTRACT

A system receives monaural sound which includes speech and background noises. The received sound is divided by frequency and time into time-frequency units (TFUs). Each TFU is classified as speech or non-speech by a processing unit. The processing unit for each frequency range includes at least one of a deep neural network (DNN) or a linear support vector machine (LSVM). The DNN extracts and classifies the features of the TFU and includes a pre-trained stack of Restricted Boltzmann Machines (RBM), and each RBM includes a visible and a hidden layer. The LSVM classifies each TFU based on extracted features from the DNN, including those from the visible layer of the first RBM, and those from the hidden layer of the last RBM in the stack. The LSVM and DNN include training with a plurality of training noises. Each TFU classified as speech is output.

20 Claims, 5 Drawing Sheets

(58) Field of Classification Search
USPC .......................................................... 704/233
See application file for complete search history.

(56) References Cited

U.S. PATENT DOCUMENTS

| | | | |
|---|---|---|---|
| 9,008,329 B1 * | 4/2015 | Mandel .................. | G10K 15/00 |
| | | | 381/71.1 |
| 9,190,053 B2 * | 11/2015 | Penn ........................ | G10L 15/16 |
| 9,378,733 B1 * | 6/2016 | Vanhoucke ............. | G10L 15/02 |
| 2003/0158830 A1 | 8/2003 | Kowalczyk et al. | |
| 2012/0072215 A1 | 3/2012 | Yu et al. | |

OTHER PUBLICATIONS

International Search Report mailed Jul. 11, 2013 for International application No. PCT/US2013/034564.
Written Opinion mailed Jul. 11, 2013 for International application No. PCT/US2013/034564.
Hamel, Philippe et al., *Learning Features from Music Audio with Deep Belief Networks*, The International Society for Music Information Retrieval Conference, pp. 339-344, (ISMIR 2010).
Jin, Zhaozhang et al., *A Supervised Learning Approach to Monaural Segregation of Reverberant Speech*, IEEE Transactions on Audio, Speech, and Language Processing, vol. 17, No. 4, May 2009.

* cited by examiner

| Mixture SNR | TIMIT | | | IEEE Female | | | IEEE Male | | |
| --- | --- | --- | --- | --- | --- | --- | --- | --- | --- |
| | Overall | Voiced | Unvoiced | Overall | Voiced | Unvoiced | Overall | Voiced | Unvoiced |
| 0 dB | 66.9% | 72.1% | 50.3% | 70.9% | 73.9% | 55.0% | 68.1% | 71.8% | 51.9% |
| -5 dB | 63.8% | 67.8% | 50.8% | 65.9% | 68.2% | 54.0% | 64.7% | 67.5% | 52.5% |

MONAURAL SPEECH FILTER

CROSS-REFERENCE TO RELATED APPLICATION

This application claims priority from and benefit of the filing date of U.S. provisional application Ser. No. 61/617,695 filed Mar. 30, 2012, and the entire disclosure of said prior provisional application Ser. No. 61/617,695 is hereby expressly incorporated by reference into the present specification.

This invention was made with government support under Air Force Office of Scientific Research, Government Grant or Contract No. FA9550-08-1-0155. The government has certain rights in this invention.

The following relates generally to acoustic processing. It finds particular application in conjunction with separating monaural speech from non-speech background interference, and will be described with particular reference thereto. However, it will be understood that it also finds application in other usage scenarios and is not necessarily limited to the aforementioned application.

Monaural sound mixture includes sound that is received in one ear. Received sound includes background noises or interference often associated with cocktail party conversations, but includes all types of background noises. The goal is to separate the speech from the background noises in order to clearly hear the speech. However, both speech and background noises vary. Monaural sound mixture can include different speakers, different noises, and different signal-to-noise ratios. Noises can include white noise, cocktail party, crow noise, traffic, playground, crowd yelling, crowd laugh, bird chirp with water flowing, strong wind, rain, factory noise, speech shape noise, F-16 noises, destroyer noises, factory noise, machine operation, electric fan, washer, footstep, child playing, and the like. Databases of noises are available.

One issue is the identification of noises and training systems to exclude those noises. The number of noises typically for which a system is trained is small, often less than 10. One problem is that training is often so specific to a particular noise that variations or generalizations of the particular noise do not work. For example, a fan noise varies from fan to fan. Training with a particular fan noise which does not generalize to all fan noises is very limiting.

Another issue relates the processing time or performance to train a system. Typically, system performance for processing training sets of noises is non-linear which requires substantial amounts of processing time to process relatively few noises. Typically processing more than 10 types of noises is computationally very expensive. With a large number of potential noises as background noises and training systems typically processing a small selected portion, current systems which exclude or filter noises are limited in the ability to generally separate noises from speech.

A unit of sound heard by the inner ear is referred to as a time-frequency (T-F) unit on a cochleagram representation. The cochleagram represents the excitation pattern of the basilar membrane in the inner ear, as a function of time. Sounds which mix speech and background noises can be electronically represented as a collection of T-F units in cochleagrams. If the characteristics of desired or undesired T-F units can be estimated using a large training set, then all sound components which match the expected characteristics of a desired T-F unit or undesired T-F unit can either be suppressed or included. The undesired noise can be suppressed and the desired speech can be included. To estimate the characteristics, the problem is formulated as binary classification Prior arts employ non-linear or Gaussian-kernel support vector machines, which provide an estimation of characteristics, but are computationally expensive. The number of training noises used to feasibly train GSVMs is typically less than 10.

The following discloses a new and improved monaural speech filter which addresses the above referenced issues, and others.

In accordance with one aspect, a system separating speech from background noises includes one or more processors programmed to receive monaural sound in an electronic format which includes speech and a plurality of background noises. The received sound is divided by frequency and time into a plurality of time-frequency units. Each time-frequency unit is classified as speech or non-speech by a processing unit. The processing unit for each frequency range includes a deep neural network which extracts the features of the time-frequency unit and includes a pre-trained stack of Restricted Boltzmann Machines, and each Restricted Boltzmann machine includes a visible layer and a hidden layer. The processing unit for each frequency range further includes a linear support vector machine which classifies the each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features includes a hidden layer of a last Restricted Boltzmann Machines in the stack. The linear support vector machine and deep neural network include training with a plurality of training noises. Each time-frequency unit classified as speech is output.

In accordance with another aspect, a method of separating monaural speech from background noise includes receiving monaural sound in an electronic format which includes speech and a plurality of background noises. The received sound is divided by frequency into a plurality of channels, and the sound of each channel by time into a plurality of time-frequency units. Each time-frequency unit is classified as speech or non-speech by a processing unit. The processing unit for each channel includes a deep neural network and a linear support vector machine. The deep neural network extracts the features of the time-frequency unit and includes a pre-trained stack of Restricted Boltzmann Machines, each Restricted Boltzmann Machine includes a visible layer and a hidden layer. The trained linear support vector machine classifies the each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features includes a hidden layer of a last Restricted Boltzmann Machines in the stack. The linear support vector machine and deep neural network include training with a plurality of training noises. Each time-frequency unit classified as speech is output.

In accordance with another aspect, a system separating speech from background noises includes one or more processors programmed to receive monaural sound in an electronic format which includes speech and a plurality of background noises. The received sound is divided by frequency into a plurality of channels, and each channel by time into a plurality of time-frequency units. Each time-frequency unit is classified as speech or background noise with a linear support vector machine for each channel trained using the input layer and the last hidden layer of a pre-trained deep neural network. Each time-frequency unit classified as speech is output.

In accordance with another aspect, a system separating speech from background noises includes a cochlear filter and one or more processing units. The cochlear filter receives monaural sound in an electronic format which includes speech and a plurality of background noises and divides the received sound by frequency and time into a plurality of time-frequency units. The one or more processing units classify each time-frequency unit as speech or non-speech and output each time-frequency unit classified as speech, the processing unit for each frequency range includes at least one of a deep neural network or a linear support vector machine. The deep neural network extracts and classifies the features of the time-frequency unit and includes a pre-trained stack of Restricted Boltzmann Machines, each Restricted Boltzmann machine includes a visible layer and a hidden layer. The linear support vector machine classifies the each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features includes a hidden layer of a last Restricted Boltzmann Machine in the stack. The linear support vector machine and deep neural network include training with a plurality of training noises.

In accordance with another aspect, a method of separating monaural speech from background noise includes receiving monaural sound in an electronic format which includes speech and a plurality of background noises. The received sound is divided by frequency into a plurality of channels, and the sound of each channel by time into a plurality of time-frequency units. Each time-frequency unit is classified as speech or non-speech by a processing unit. The processing unit for each channel includes at least one of a deep neural network or a trained linear support vector machine. The deep neural network extracts and classifies the features of the time-frequency unit and includes a pre-trained stack of Restricted Boltzmann Machines, each Restricted Boltzmann Machine includes a visible layer and a hidden layer. The trained linear support vector machine classifies the each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features include a hidden layer of a last Restricted Boltzmann Machine in the stack. The linear support vector machine and deep neural network include training with a plurality of training noises. Each time-frequency unit classified as speech is output.

One advantage is the efficient large-scale training with background noises.

Another advantage is low complexity in separating speech using linear binary classification.

Another advantage resides in the ability to learn effective acoustic features using pre-trained deep neural networks.

Another advantage resides in generalization of training noises. Another advantage includes reasonable computational overhead in training the system.

Another advantage includes low computational overhead in filtering background interference from monaural sounds.

Still further advantages will be appreciated to those of ordinary skill in the art upon reading and understanding the following detailed description.

The invention may take form in various components and arrangements of components, and in various steps and arrangement of steps. The drawings are only for purposes of illustrating the preferred embodiments and are not to be construed as limiting the invention.

Figure 1:
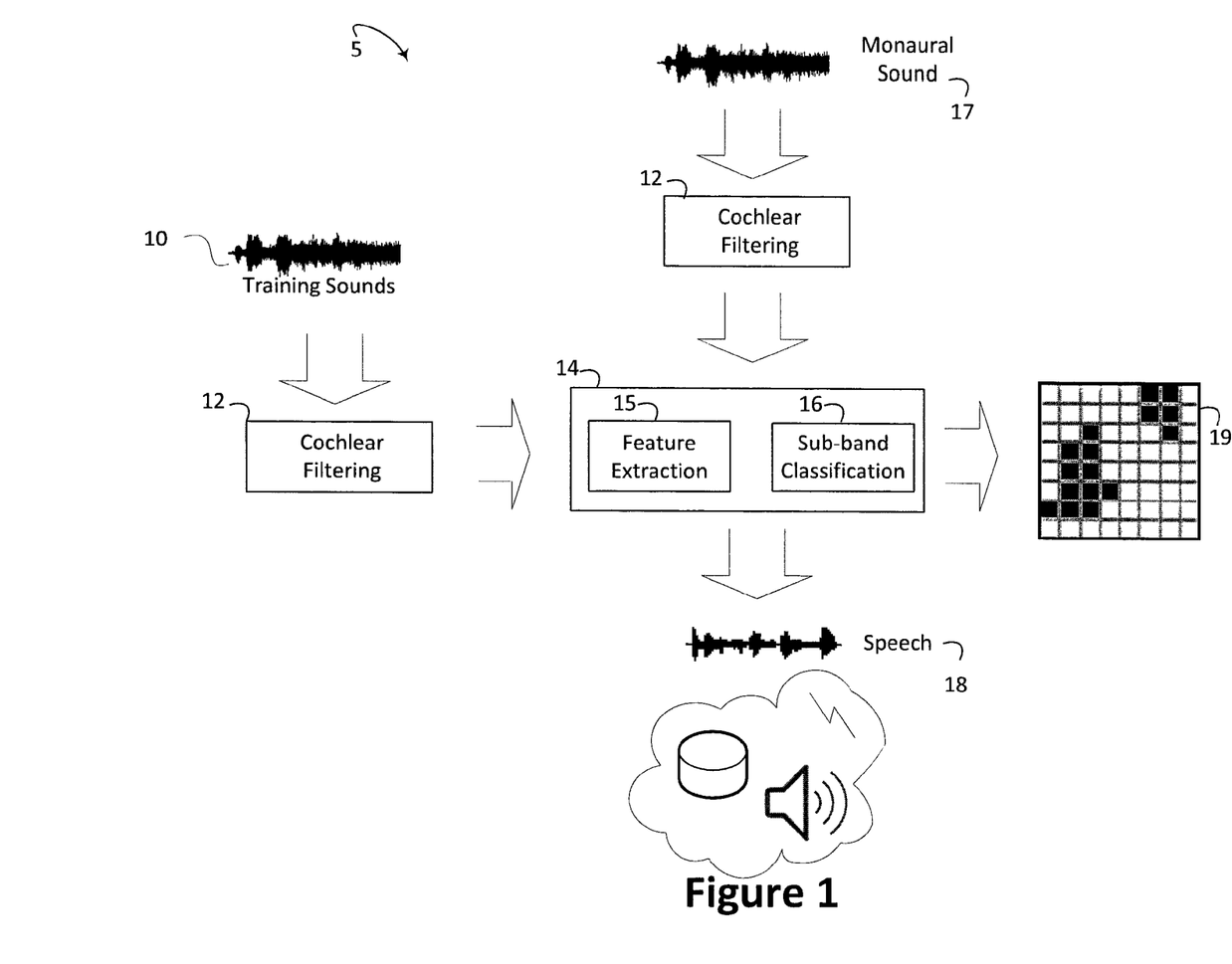
FIG. 1 diagrammatically illustrates an embodiment of the system.

With reference to FIG. 1, one embodiment of the system 5 is diagrammed. In the training phase, training sounds 10 are received and divided into Time-Frequency (T-F) units by sound frequency and time using a cochlear filter 12 such as a gammatone filterbank. Training sounds include utterances of speech and background noises. For example, sounds can be divided into 64 channels spaced in a frequency between 50 and 8000 Hz. The sound of each channel is broken down by time into a segment such as 20 milliseconds shifted in 10 millisecond increments. Each segment of each channel represents a T-F unit.

Each frequency range is processed by a processing unit 14. The processing unit includes a pre-trained deep neural network (DNN) 15, which extracts the features through a training process. The trained DNNs or alternatively linear support vector machines (LSVMs) 16 constructed from each trained DNN 15 classifies each time-frequency unit. The system processes monaural sounds 17 such as sound mixtures of speech and background noise through the cochlear filter 12 which generates T-F units. The T-F units are processed by the processing unit 14 which classifies each T-F unit in the cochleagram as speech or non-speech. Non-speech includes background noises. Speech includes generalized speech such as utterances from a variety of male and female speakers. Background noises can be varied by input signal to noise ratios, room reverberations, channel distortions and the like. T-F units classified as speech pass through the processing unit. Background noises are not passed through the processing unit. Speech 18 which passes through the processing unit is combined. The combined speech is then output to another device, to storage, to a speech synthesizer, a combination, and the like. The processing unit 14 acts as a filter which separates speech from background noises. The classification of monaural sound using the system can be represented as an estimated ideal binary mask (EIBM) 19. The EIBM can be embodied for example, as a binary matrix with rows for each frequency range and columns for each time interval.

The system in one embodiment includes one or more processors configured as trained DNNs or LSVMs 16 constructed from trained DNNs 14. The processing unit 14 can be incorporated into other devices and optionally share a processor with other functions of the system. In one example, pre-training is done on an 8-core processor machine for each channel, and the training distributed to a cluster of 64 servers. The training for each channel is independent. The processing unit 14 is suitably embodied by an electronic data processing device, such as the electronic processor or electronic processing device, or by a network-based server computer, or so forth. Moreover, the processing unit 14 is suitably implemented as a non-transitory storage medium storing instructions (e.g., software) readable by an electronic data processing device and executable by the electronic data processing device to perform the disclosed speech separation techniques.

Figure 2:
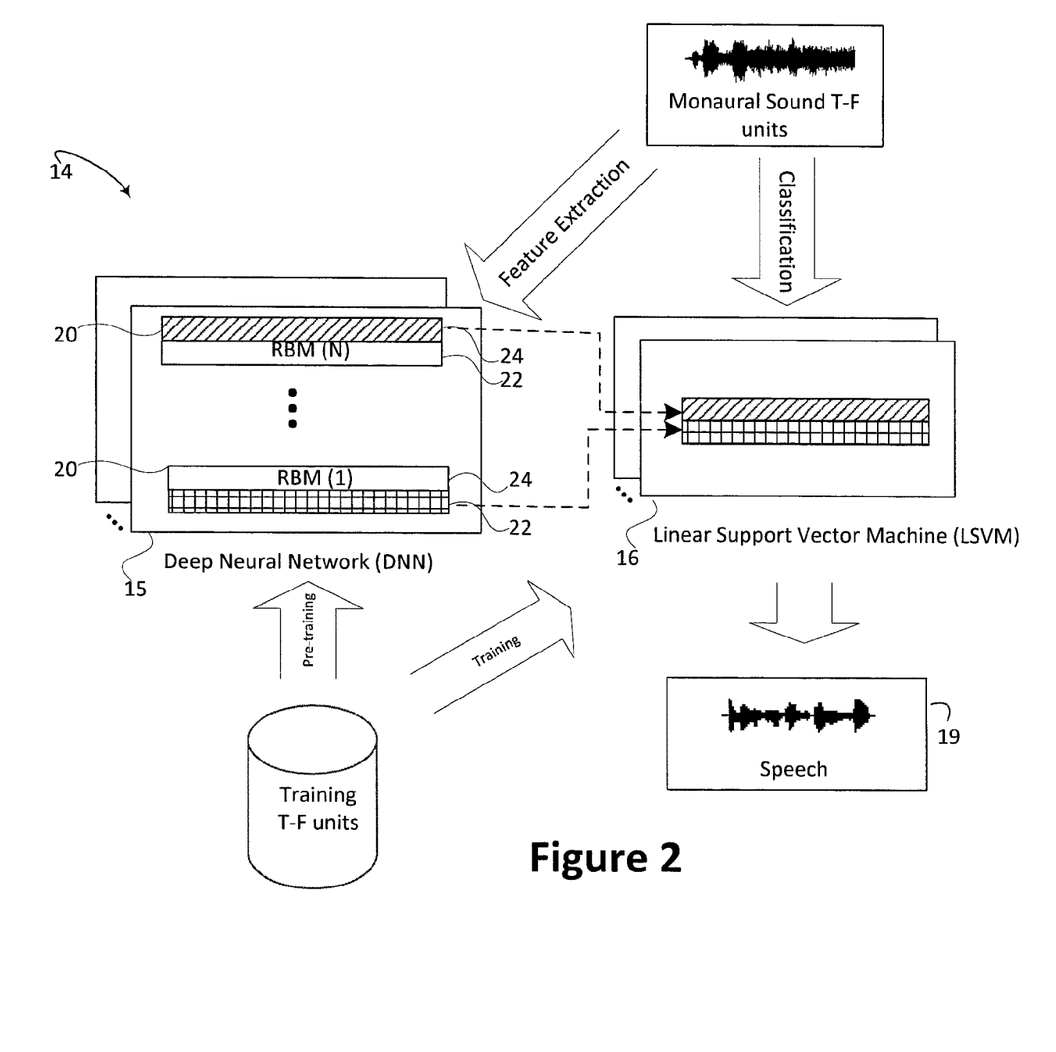
FIG. 2 diagrammatically illustrates one embodiment of the system with the construction of the linear support vector machines.

With reference to FIG. 2, a detailed view of one embodiment of the DNN is shown. Each DNN includes a stack of Restricted Boltzmann Machines (RBMs) 20. Boltzmann machines are probabilistic, generative models, which can be used to find regularities (features) hidden in raw input. RBMs are two-layer neural networks with a visible layer 22 and a hidden layer 24. RBMs simplify Boltzmann machines by allowing connections only between the visible and hidden layer. An RBM has an energy function defining joint probability:

$$p(v, h) = \frac{e^{-E(v,h)}}{Z} \qquad (1)$$

where v and h denote a visible and hidden layer configuration, respectively. Z is called the partition function to ensure p(v,h) is a valid probability distribution. The hidden layer is binary and hidden units are Bernoulli random variables. But the visible layer v can be either binary or real-valued, the latter being more suitable for modeling acoustic features. If one assumes visible units are Gaussian random variables with unit variance, then the energy function E can be defined for this Gaussian-Bernoulli RBM as:

$$E(v,h) = \tfrac{1}{2}\Sigma_i(v_i - a_i) - \Sigma_j b_j h_j - \Sigma_{i,j} w_{ij} v_i h_j \qquad (2)$$

where $v_i$ and $h_j$ are the ith and jth units of v and h, $a_i$ and $b_j$ are the biases for $v_i$ and $h_j$, respectively, and $w_{ij}$ is the symmetric weight between $v_i$ and $h_j$. The fact that an RBM is bipartite makes inference of h easy as conditional distribution p (h|v) and p (v|h) factorize to p (h|v)=$\Pi_j$p ($h_j$|v) and p (v|h)=$\Pi_{ji}$p ($v_i$|h), and, $$p(h_j = 1|v) = \sigma(b_j + \Sigma_i w_{ji} v_i) \qquad (3)$$

$$p(v_i|h) = N(v_i; a_i + \Sigma_j w_{ij} h_j, 1), \qquad (4)$$

where $\sigma(x) = 1/(1+e^{-x})$ is the standard logistic sigmoid function and N denotes the normal distribution. A RBM is trained by calculating the gradient of the negative log likelihood. Let a denote any parameter in E, given a training sample $v_0$, the gradient is:

$$-\frac{\partial(\log p(v_0))}{\partial \theta} = E_{p(h|v_0)}\left[\frac{\partial E(v_0|h)}{\partial \theta}\right] - E_{p(v|h)}\left[\frac{\partial E(v|h)}{\partial \theta}\right] \qquad (5)$$

While inference is easy, exact learning is still hard in RBMs as the calculation of the second term in Equation 5 is intractable. One iteration of contrastive divergence often works reasonably well. A mini-batch or stochastic gradient descent (SGD) is used to perform optimization following the approximated gradient. Both feature learning and LSVM training are carried out for each filter channel.

The DNNs 14 are unsupervisedly pre-trained using RBMs in a greedy layerwise fashion. Raw acoustic features are used as training data to train the first RBM, whose hidden activations are then treated as the new training data for the second RBM, and so on. A Gaussian-Bernoulli RBM is used for the first layer and Bernoulli-Bernoulli RBMs for all the layers above. The weights resulting from training a stack of RBMs are used to initialize a feed-forward neural network, which aids the subsequent backpropagation training and provides a measure of regularization.

The whole network is then supervisedly fined-tuned to make internal representations discriminative using the backpropagation algorithm with a logistic output layer such as the limited-memory Broyden-Fletcher-Goldfarb-Shanno algorithm (L-BFGS), SGD, or other optimizers. The last hidden layer activations are chosen as the learned features, after the network is sufficiently fine-tuned. The weights from the last hidden layer to the output layer define a linear classifier. Hence, the last hidden layer activations are more amenable to linear classification. The trained DNN classifies each time-frequency unit. The classification can be further improved by concatenating the learned features with the raw features, and train sub-band LSVMs on the concatenated features from the DNNs 14. The sub-band LSVMs can be further enhanced by using auditory segmentation. DNN's 14 discriminative feature learning is conveniently handled by the backpropagation algorithm. Relatively speaking, gradient descent based training does not have large complexity and has good scalability, which means that Mini-batch and SGD are suitable for large-scale learning and naturally permit online learning. Feature decoding is extremely fast in feedforward networks. The learned features are obtained by passing the raw data through the DNNs, which allows efficient training and testing.

A large training dataset includes utterances of speech such as randomly chosen 100 male utterances and 100 female utterances across 8 dialect regions. The large dataset can include the utterances mixed with noises. For example, 200 utterances are mixed with 100 environmental noises at 0 dB, which produces about 6 million training samples or T-F units or each channel. In one example, 150 epochs or steps of mini-batch gradient descent are used for RBM pre-training, and 1000 epochs of L-BFGS are used for fine-tuning the whole network. A learning rate of 0.001 is used for the first Gaussian-Bernoulli RBM and 0.1 for the Bernoulli-Bernoulli RBM. All the data are variance normalized as assumed by Equation 2.

Each LSVM 17 is constructed from a concatenation of the visible layer 22 of the first RBM and the hidden layer 24 of the last RBM. The visible layer of the first RBM represents the raw acoustic features and the hidden layer of the last RBM represents the learned features. The processing unit 14 is further refined by cross-channel correlation based auditory segmentation.

A distance analysis analyzes the effect of discriminative feature learning. The distance from the +1 class (target-dominant) to the −1 class (interference-dominant) within a feature set could be a quantitative measure of class separability. Using the constrained minimum (CM) distance as a metric, the CM distance compares the summary statistics between feature sets and is of Mahalanobis type:

$$d_{CM}(D_1, D_2|S)^2 = (\mu_1 - \mu_2)^T cov^{-1}[S](\mu_1 - \mu_2), \qquad (6)$$

where $\mu_1$ and $\mu_2$ are the means of the datasets $D_1$ and $D_2$, respectively. S is the underlying feature distribution function, which we estimate from the datasets. The class distribution on a 2-D plane can be visualized by the pairwise CM distance are calculated between the raw features and the learned features of each noise, and a metric multidimensional scaling (MDS) performed.

Figure 3:
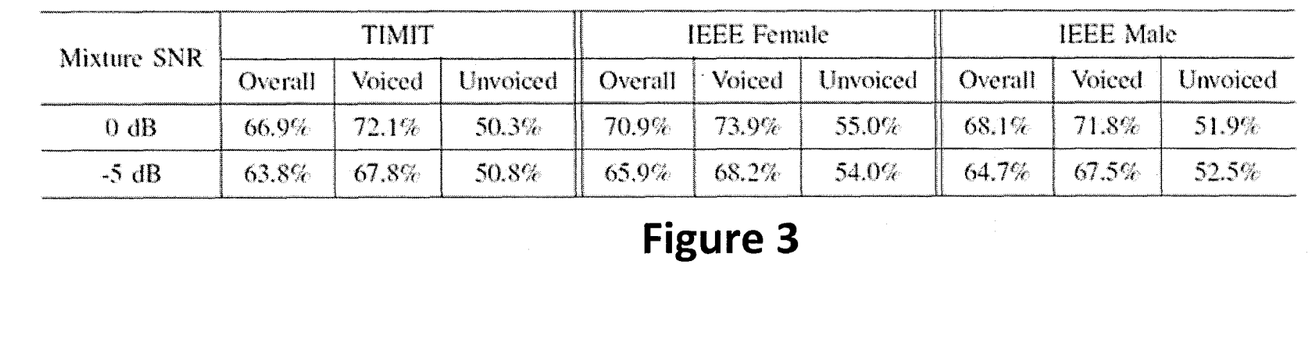
FIG. 3 illustrates the results of testing one embodiment with various monaural sound datasets.

FIG. 3 illustrates the separation results for various datasets (e.g. DARPA TIMIT, and IEEE corpus). The system achieves very promising results in terms of generalization to new noises and speakers. Results include mixtures of signal to noise ratios (SNR) at 0 dB and −5 db. Results include an overall evaluation, voiced sound mixtures, and unvoiced sound mixtures. The percentages are the true positive (HIT) minus false alarm (FA) rates of the EIBM compared to the IBM. HIT-FA rate has been shown to be highly correlated to human speech intelligibility in noise.

Figure 4A:
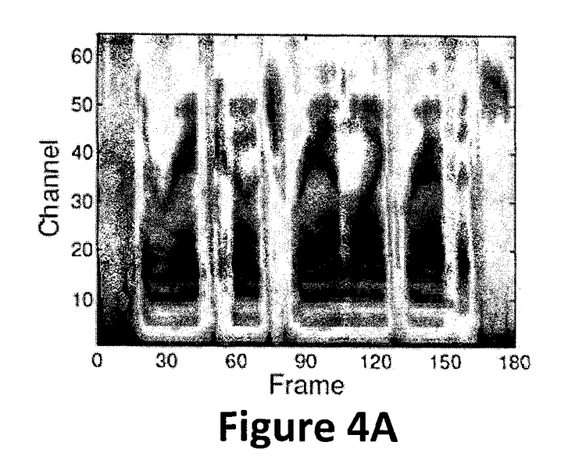
FIG. 4 visually represents the operation of the system on a cochleagram.
Figure 4B:
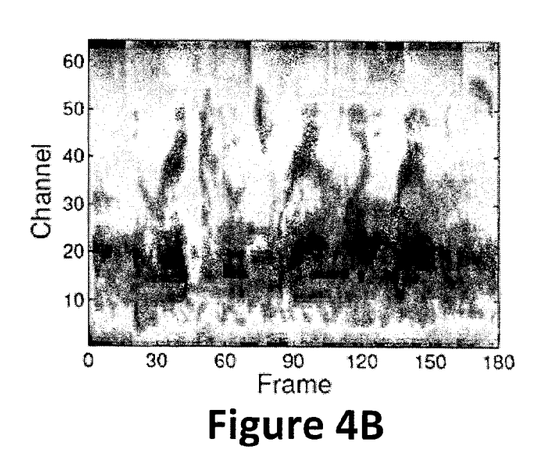
Figure 4C:
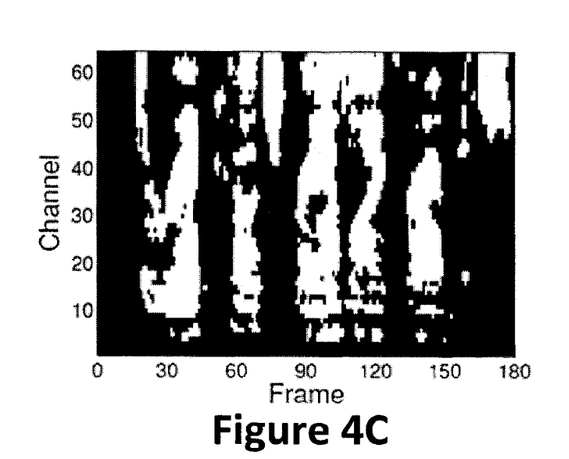
Figure 4D:
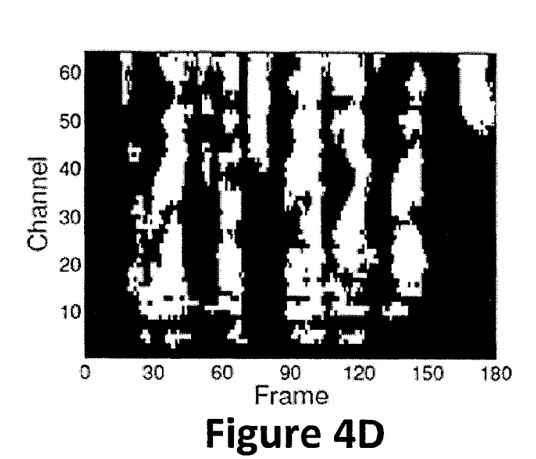

With reference to FIG. 4A-B, an example of monaural sound and the EIBM 16 are visually illustrated. FIG. 4A shows a visual representation of a cochleagram with a TIMIT dataset utterance. FIG. 4B shows the cochleagram mixed with a cocktail party noise. FIG. 4C shows the ideal binary mask and FIG. 4D shows the estimated ideal binary mask (EIBM) produced by the disclosed speech separation technique.

The processing unit 14 can be included in other devices such hearing aids, phones, cochlear implants, mobile devices, headsets with noise reduction capability, software for automatic speaker and speech recognition in background noise, software for retrieving audio information (from Internet and audio databases), and the like.

Figure 5:
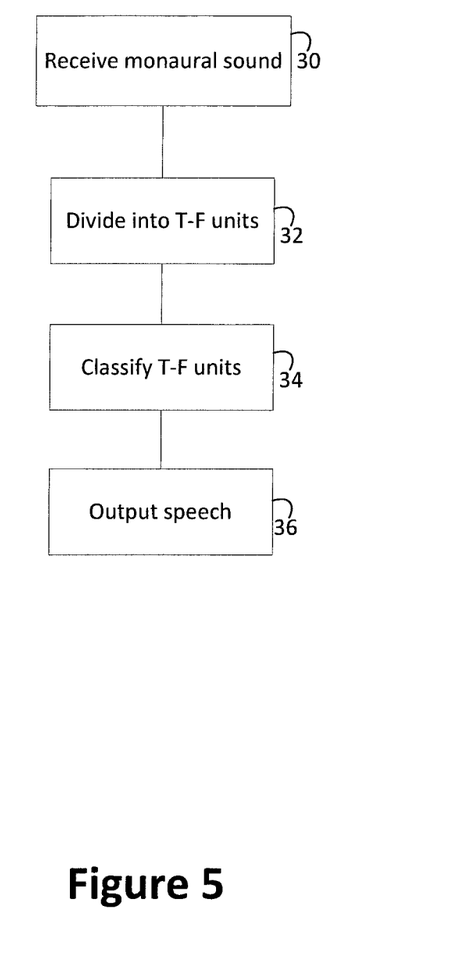
FIG. 5 flowcharts an embodiment of the system.

With reference to FIG. 5, an embodiment of the system is flowcharted. In a step 30, monaural sound is received by the system 5. The sound includes speech and background interference or noises. The monaural sound can be previously be received by a sound receiving device which converts sound waves into an electronic format.

The received sound is divided into T-F units by frequency and time in a step 32. A range of frequencies are assigned to each channel and can be divided uniformly or otherwise. For example, a range of 50-8000 Hz can be uniformly divided into 64 channels on the equivalent rectangular bandwidth scale. The frequencies of each channel are further divided by time into segments such as 20 millisecond shifted by 10 milliseconds. Each time segment of each channel represents a T-F unit in a cochleagram.

In a step 34, each T-F unit is classified as speech or non-speech. The collection of all classified T-F units of a sound mixture forms the EIBM of that sound mixture. The DNN is trained to extract features and classify T-F units. The LSVM can be further trained using raw acoustic features concatenated with learned features from the DNN.

The T-F units classified as speech are output in a step 36. The output T-F units can be synthesized into speech. The combined output can be further stored electronically, transmitted, or output as sound using a speech synthesizer such as a speech synthesizer device or speaker.

It is to be appreciated that in connection with the particular illustrative embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A system separating speech from background noises, comprising:
   a cochlear filter which receives monaural sound in an electronic format which includes speech and a plurality of background noises and divides the received sound by frequency and time into a plurality of time-frequency units;
   one or more processing units which classify each time-frequency unit as speech or non-speech and output each time-frequency unit classified as speech, the processing unit for each frequency range including at least one of:
   a deep neural network which extracts and classifies the features of the time-frequency unit and includes a pre-trained stack of Restricted Boltzmann Machines, each Restricted Boltzmann Machine includes a visible layer and a hidden layer; or
   a linear support vector machine which classifies the each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features includes a hidden layer of a last Restricted Boltzmann Machine in the stack, and
   wherein the linear support vector machine and deep neural network include training with a plurality of training noises.

2. The system according to claim 1, wherein the plurality of training noises exceeds 10 distinct background noises.

3. The system according to claim 1, further including:
   a sound receiving device which converts the monaural sound waves to an electronic format.

4. The system according to claim 1, further including:
   a sound synthesizer which combines the output time-frequency units.

5. The system according to claim 4, wherein the sound synthesizer outputs the combined output as monaural sound waves.

6. The system according to claim 1, wherein the frequency includes the range 50 Hz to 8000 Hz.

7. The system according to claim 1, wherein the time of each time-frequency unit includes 20 milliseconds shifted by 10 milliseconds.

8. The system according to claim 1, wherein the number of frequency ranges includes 1-64, and each frequency range is cross correlated.

9. A method of separating monaural speech from background noise, comprising:
receiving monaural sound in an electronic format which includes speech and a plurality of background noises;
dividing the received sound by frequency into a plurality of channels, and the sound of each channel by time into a plurality of time-frequency units;
classifying each time-frequency unit as speech or non-speech by a processing unit, wherein the processing unit for each channel includes at least one of:
a deep neural network which extracts and classifies the features of the time-frequency unit and includes a pre-trained stack of Restricted Boltzmann Machines, each Restricted Boltzmann Machine includes a visible layer and a hidden layer; or
a trained linear support vector machine which classifies each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features include a hidden layer of a last Restricted Boltzmann Machine in the stack; and
wherein the linear support vector machine and deep neural network include training with a plurality of training noises; and
outputting each time-frequency unit classified as speech.

10. The method according to claim 9, wherein the plurality of training noises exceeds 10 distinct background noises.

11. The method according to claim 9, further including:
converting the monaural sound waves to an electronic format.

12. The method according to claim 9, wherein outputting further includes:
combining the output time-frequency units.

13. The method according to claim 9, wherein outputting further includes outputting the combined output as monaural sound waves.

14. The method according to claim 9, wherein the frequency includes the range 50 Hz to 8000 Hz.

15. The method according to claim 10, wherein the time of each time-frequency unit includes 20 milliseconds shifted by 10 milliseconds.

16. A system separating speech from background noises, comprising:
one or more processors programmed to:
receive a plurality of time-frequency units;
classify each time-frequency unit as speech or non-speech; and
output each time-frequency unit classified as speech;
wherein each processor is programmed for a corresponding frequency range, the processor for each frequency range including:
a deep neural network which extracts and classifies the features of the time-frequency unit and includes a pre-trained stack of Restricted Boltzmann Machines, each Restricted Boltzmann Machine includes a visible layer and a hidden layer; and
a linear support vector machine which classifies each time-frequency unit based on extracted features from the deep neural network and includes visible features and hidden features, the visible features include a first visible layer of a first Restricted Boltzmann Machine in the pre-trained stack of Restricted Boltzmann Machines, and the hidden features includes a hidden layer of a last Restricted Boltzmann Machine in the stack, and
wherein the deep neural network is trained with raw acoustic features of the time-frequency units to generate learned features, and the linear support vector machine is trained with the learned features concatenated with the raw acoustic features; and
wherein the linear support vector machine and deep neural network include training with a plurality of training noises.

17. The system according to claim 16, wherein the plurality of training noises exceeds 10 distinct background noises.

18. The system according to claim 16, further including:
a cochlear filter which receives monaural sound in an electronic format which includes speech and a plurality of background noises and divides the received sound by frequency and time into the plurality of time-frequency units, the cochlear filter being configured to transmit the plurality of time-frequency units to the one or more processors.

19. The system according to claim 16, further including:
a sound receiver which converts the monaural sound waves to an electronic format.

20. The system according to claim 16, further including:
a sound synthesizer which combines the output time-frequency units as monaural sound waves.

* * * * *